United States Patent [19]
Berry et al.

[11] 3,982,606
[45] Sept. 28, 1976

[54] ACOUSTICAL LOGGING APPARATUS HAVING SIGNAL DELAY MEANS

[75] Inventors: James E. Berry, Forney; Andrew J. D. Straus, Dallas, both of Tex.

[73] Assignee: Mobil Oil Corporation, New York, N.Y.

[22] Filed: Jan. 22, 1975

[21] Appl. No.: 543,000

[52] U.S. Cl. .............................. 181/102; 181/105; 166/241; 175/50; 181/36 D
[51] Int. Cl.² .......................................... G01V 1/40
[58] Field of Search ............... 166/241, 177; 175/1; 181/102, 105, 35 R, 36 B, 36 D

[56] References Cited
UNITED STATES PATENTS

| | | | |
|---|---|---|---|
| 2,350,371 | 6/1944 | Smith | 340/18 R |
| 2,606,793 | 8/1952 | Suter | 166/241 |
| 2,754,160 | 7/1956 | Owen | 166/241 |
| 3,054,471 | 9/1962 | Knudsen | 340/17 |
| 3,190,388 | 6/1965 | Moser et al. | 340/18 R |
| 3,191,142 | 6/1965 | Lebourg | 340/18 R |
| 3,205,941 | 9/1965 | Walker | 181/105 |
| 3,484,141 | 12/1969 | Collett | 166/241 |
| 3,560,060 | 2/1971 | Morris | 166/241 |

*Primary Examiner*—Howard A. Birmiel
*Attorney, Agent, or Firm*—C. A. Huggett; Drude Faulconer

[57] ABSTRACT

An acoustical logging apparatus which has a means for interfering with those unwanted signals which inherently travel in the mud between the transmitter and the closest receiver of said apparatus during a logging operation. The signal interference means comprises a rotating sleeve having signal attenuation elements mounted thereon which are adapted to extend to the wall of the borehole to act as a centralizer when the apparatus is in the borehole. These elements are vertically stacked in an overlapped relationship so as to present an obstructed path through the mud for said signals but so as to offer only nominal resistance to displacement of mud as the apparatus is moved therethrough.

5 Claims, 6 Drawing Figures

FIG. 2
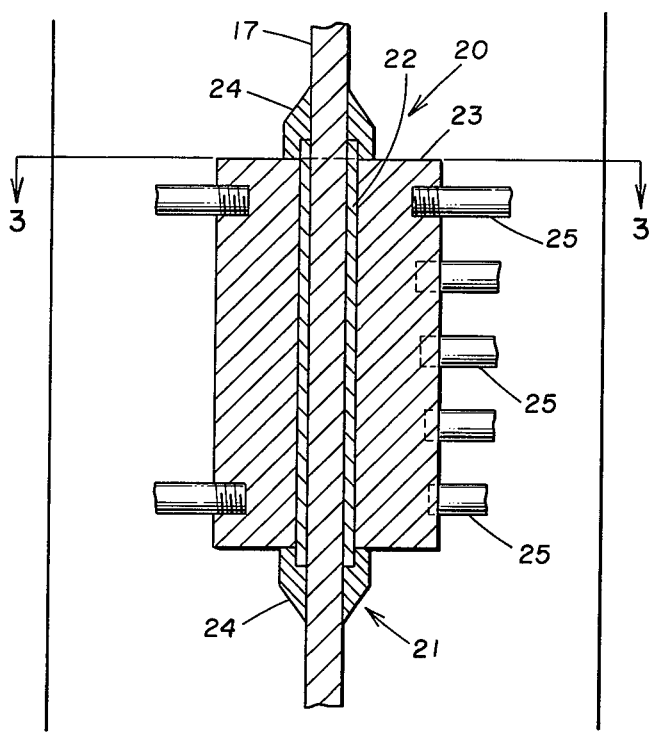
FIG. 4
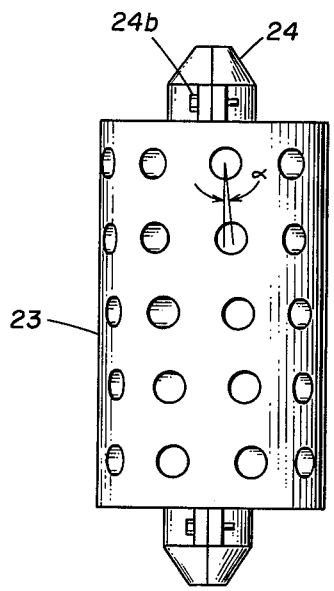
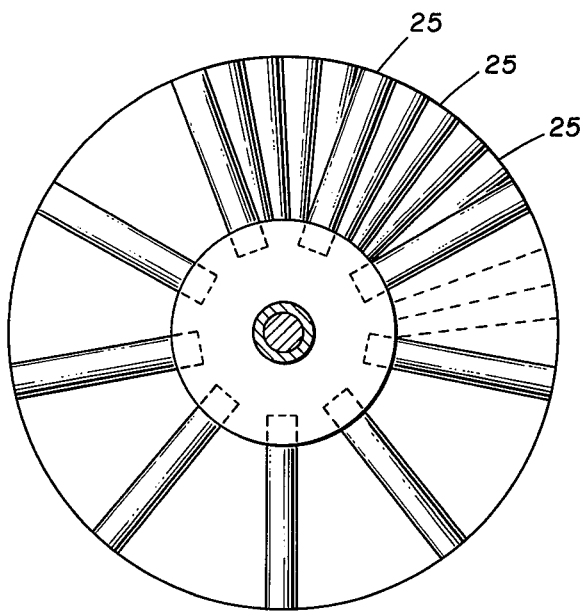
FIG. 3

ACOUSTICAL LOGGING APPARATUS HAVING SIGNAL DELAY MEANS

BACKGROUND OF THE INVENTION

This invention relates to acoustic velocity well logging apparatus and more particularly to an acoustical logging apparatus having means for interfering with the unwanted acoustical signals which inherently travel in the mud between the transmitter and the receiver of the apparatus during a logging operation.

Acoustical velocity well logging is used to determine certain characteristics of earth formations penetrated by a borehole of a well. Basically, acoustical logging employs a downhole tool which has a transmitter of acoustical signals and a receiver for detecting these acoustical signals after they have traveled through the formation adjacent the tool. Knowing the distance between the transmitter and the receiver, the velocity of the acoustical signal through the formation adjacent the tool is determined by measuring the traveltime of the acoustical signal between the transmitter and the receiver. By correlating the traveltime with the depth at which it occurs, a log is obtained which, when analyzed, provides valuable information as to formations so logged.

Many acoustical logging tools now utilize more than one receiver, wherein the receivers are spaced at greater distances from the transmitter than before. A typical tool of this type spaces these receivers by suspending them from the transmitter on a support member which does not readily transmit acoustic energy, e.g., a cable or the like. The exact distances between the transmitter and the respective receivers are critical in accurately determining traveltimes of the signals, so twisting of the support member as it moves through the borehole should be avoided.

Furthermore, since the borehole is normally filled with a fluid, e.g., drilling mud, during a logging operation, whenever the transmitter emits an acoustical pulse an unwanted signal inherently results in the mud which travels from the transmitter to the receivers. This unwanted signal, if received at approximately the same time as the signal transmitted through the formation, seriously affects the wanted acoustical signal transmitted through the formation.

The undesirability of unwanted signals which travel in the borehole fluid during a similar logging operation was recognized in U.S. Pat. No. 2,350,371 to Smith, issued June 6, 1944, wherein discs of rubber were attached to the support member between the transmitter and the receiver and extended out into contact with the cased borehole to attenuate such signals. However, since normal logging operations are carried out as the tool is raised through a mud-filled borehole, these solid discs, being in contact with the borehole, act as pistons on a pump and seriously impede the raising of the tool. Also, their contact with the borehole may cause the transmitter and receiver to twist relative to each other which, as explained above, is undesirable.

SUMMARY OF THE INVENTION

The present invention provides an acoustical logging apparatus having means which substantially interfers with the unwanted signals which are inherently generated in the borehole fluid. At the same time, however, this means allows ready displacement of the borehole fluid thereby offering only minimum resistance to the movement of the apparatus as it is raised through the borehole. Further, the signal interference means, which also serves to center the apparatus within the borehole, is so mounted that it aids in eliminating twisting of the support member of the tool as it moves through the borehole during a logging operation.

Structurally, the present invention comprises an acoustical logging apparatus having a transmitter from which one or more receivers are suspended by means of a support member. A means for interfering with the unwanted signals which travel through the borehole fluid is positioned on the support member between the transmitter and the closest of said receivers. The signal interference means has a means for rotatably mounting said signal interference means on the support member. Extending outward from said mounting means are a plurality of interference elements. These elements are designed to extend from said support member into contact with the borehole when the apparatus is positioned therein. The elements are vertically stacked in an overlapped relationship so as to substantially obstruct the travel path in the fluid of signals between the transmitter and the receiver. However, the spacing between the elements provides a ready path for the displacement of borehole fluid so that there is only nominal resistance to the movement of the apparatus as it is moved through the borehole.

Specifically, in a first embodiment, the signal interference means is comprised of a centralizing means which has a rotatable sleeve from which a plurality of fingers extend a distance sufficient to contact the bore. The fingers are arranged in overlapping vertical rows to obstruct the travel path of acoustical signals traveling within the borehole fluid between the transmitter and the receiver. The fingers are preferably made from acoustically absorptive material, e.g., rubber, so that the signals upon contacting said fingers are substantially attenuated. Also, the obstructed path will delay the arrival time of the signals at the receiver. However, the relative size of the fingers and the vertical spacing between said rows of fingers allow ready displacement of the fluid whenever the tool is moved in the borehole.

In a second embodiment, the signal interference means comprises a means for rotatably mounting said means on the support member. A plurality of acoustical absorptive discs, each having a series of relatively large openings therethrough, are affixed to the mounting means in a vertical relationship so that when the discs are in position, the openings in one disc are misaligned with the openings in another of said discs, thereby providing an obstructed travel path for the unwanted signals but still providing a ready path for displacement of fluid when the apparatus is moved.

BRIEF DESCRIPTION OF THE DRAWINGS

The actual construction, operation, and the apparent advantages of the present invention will be better understood by referring to the drawings in which like numerals identify like parts and in which:

FIG. 2 is an enlarged sectional view of one of the signal interference means shown in FIG. 1;

FIG. 3 is a sectional view taken along section line 3—3 of FIG. 2;

FIG. 4 is a perspective view of the device of FIG. 2 with the fingers removed;

DESCRIPTION OF THE PREFERRED EMBODIMENTS

Figure 1:
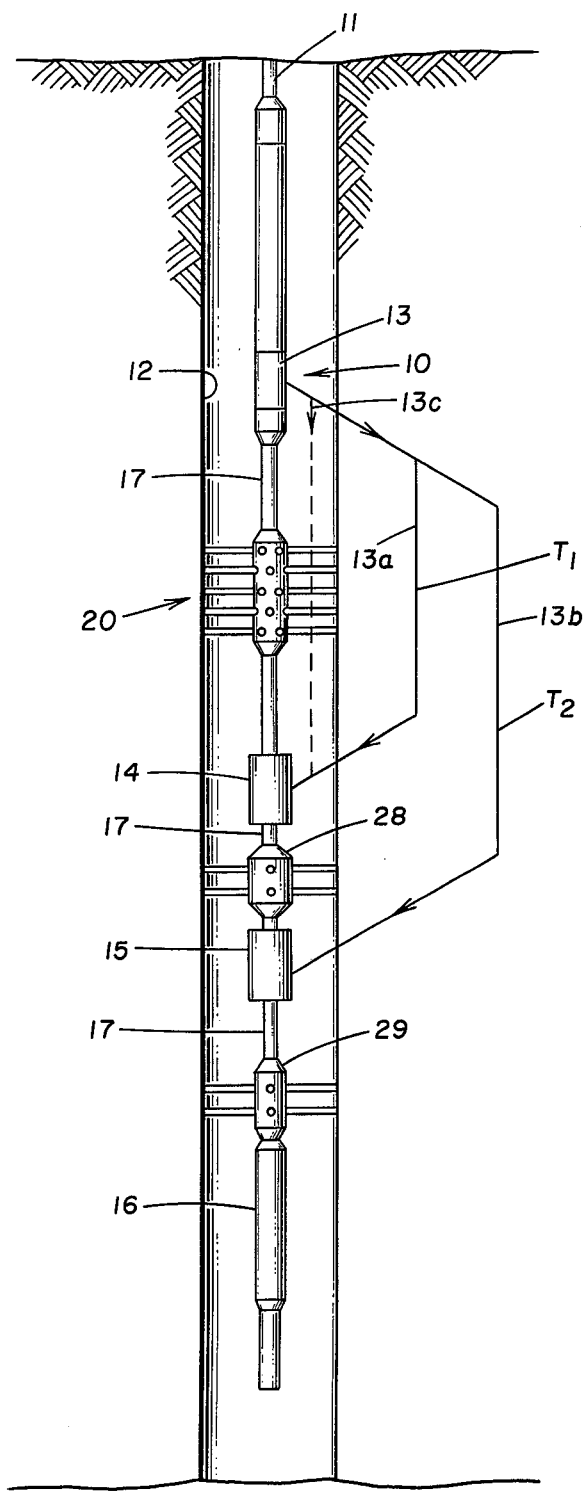
FIG. 1 is an elevational view, partly in section, of the present invention acoustical logging apparatus in position within a well borehole.

Referring more particularly to the drawings, FIG. 1 discloses an acoustical logging apparatus 10 suspended within borehole 12 by means of logging cable 11. Logging apparatus 10 is comprised of a transmitter 13 and receivers 14, 15 which are suspended from transmitter 13 by support member 17. At the lower end of member 17 is a sinker bar or weight 16. As is well known in the art, transmitter 13 emits an acoustical pulse which radiates outwardly therefrom into an adjacent formation where it travels along paths 13a, 13b to receivers 14, 15, respectively. The times $T_1$, $T_2$ that it takes for a specific pulse to travel from transmitter 13 to receivers 14, 15, respectively, are recorded and processed by circuitry (not shown) and, when correlated with the depth at which they originate, provide the desired acoustic log of the borehole.

Unfortunately, as an acoustic pulse is emitted by transmitter 13, an unwanted signal is inherently generated in the borehole fluid, e.g., drilling mud, which normally surrounds apparatus 10 during a logging operation. This signal will normally travel along path 13c at a slower rate than that at which the same signal will travel in the formation. However, since path 13a, as illustrated, is substantially longer than path 13c, the unwanted signal may arrive at approximately the same time as the formation signal and will seriously distort or mask the desired signal.

Further, it may also be desirable to detect and measure additional acoustic energy such as the transverse or shear mode of transmission which travels essentially along path 13a, but arrives later than the first, more direct signal along said path. The effective rate of travel for this shear wave signal may be substantially equal to or slower than the rate of travel for the unwanted signal through the borehole fluid. Thus, interference between the two signals at the receiver is likely. Elimination of the borehole fluid signal by attenuation and/or delay will significantly increase the signal-to-noise ratio of the later arriving shear wave signal.

To carry out this function, signal interference means 20 is positioned on support member 17 between transmitter 13 and receiver 14. As illustrated in FIGS. 1 to 3, signal interference means 20 comprises a means 21 for rotatably mounting said interference means on support member 17. Mounting means 21 is comprised of inner member 22 on which sleeve 23 is rotatably mounted. Split bushings 24, joined by screws 24b, or the like, are provided to affix inner member 22 to support member 17. Inner member 22 may be slipped over support member 17 as shown, or in some cases for ease of assembly, either or both inner member 22 or sleeve 23 can be made in sections and then joined by welding, screws, or the like after they are positioned on support member 17, this type of assembly being well known in the art. Further, in addition to the machined bearing surfaces shown, ball bearings, needle bearings, coated or other bearing surfaces (not shown) may be provided between inner member 22 and sleeve 23, if desired.

Attenuation elements or fingers 25 made of an acoustical absorptive material, such as rubber or the like, are attached to sleeve 23 and are of a sufficient length to extend out to and contact the wall of the borehole. This length would differ depending on the diameter of the borehole in which the logging operation is to be run. For this purpose, fingers 25 can be provided with threads so that fingers of different lengths can be easily interchanged as the situation dictates.

Since the fingers extend to the borehole, signal interference means 20 serves as a centralizer for keeping the upper part of apparatus 10 in a proper position during a logging operation. Also, since sleeve 23 can rotate relative to fixed member 22, when fingers 25 contact the borehole, support member 17 will not twist and the distance between transmitter 13 and receiver 14 will not change. This type of centralizer, per se, is fully disclosed and claimed in copending U.S. application Ser. No. 485,699, filed July 5, 1974 and assigned to present assignee.

However, in the present invention, fingers 25 are stacked vertically so as to effectively obstruct path 13c through the mud from transmitter 13 to the nearest receiver 14. By placing fingers 25 in respective rows or the like on sleeve 23 vertically spaced from each other and radially misaligning said fingers to overlap same, the unwanted signal traveling in the mud will encounter those fingers in its path which in turn will substantially attenuate and delay said signal.

Although the overlapped fingers 25 offer an obstructed path to a signal traveling in the mud, they do not substantially increase resistance to the displacement of the mud as apparatus 10 is raised and lowered within borehole 12. This is due to the fact that the spacing of the fingers allows the mud to easily flow around the fingers as apparatus 10 is moved within the borehole. In the embodiment illustrated in the drawing, fingers 25 are arranged in five vertical rows of nine fingers each and are offset by angle $\alpha$ of 5°. This will substantially block any potential path 13c.

Additional centralizers 28, 29, such as disclosed in copending United States application Ser. No. 485,699, are positioned on support member 17 between receivers 14 and 15 and between receiver 15 and weight 16 to maintain the lower part of apparatus 10 in proper position during a logging operation.

Figure 6:
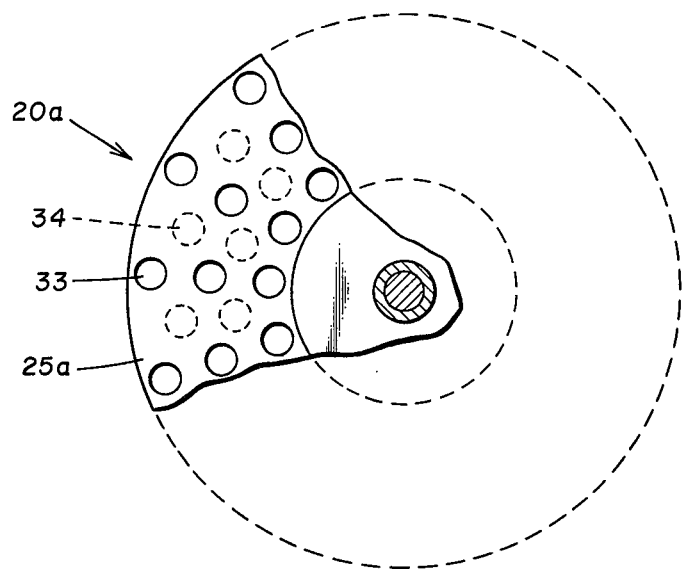
FIG. 6 is a sectional view taken along section line 6—6 of FIG. 5.
Figure 5:
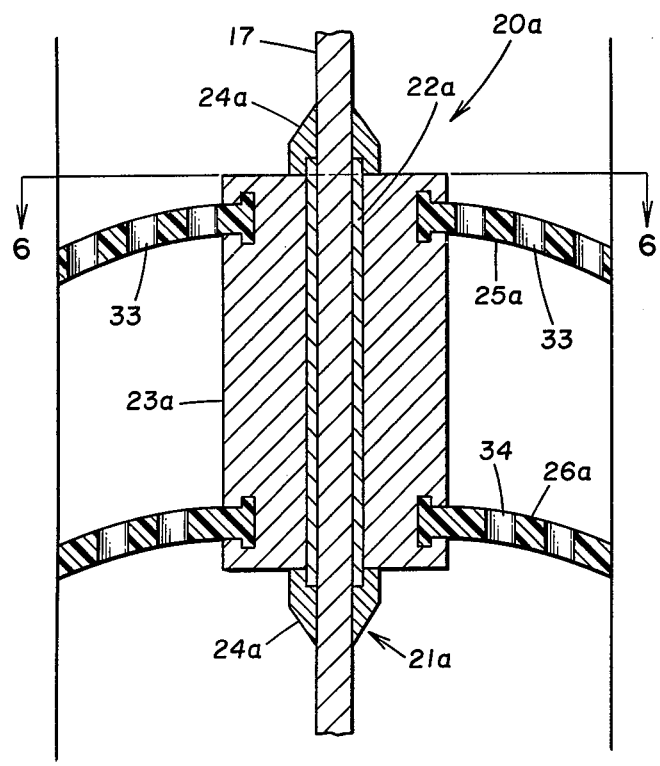
FIG. 5 is a sectional view of another embodiment of a signal interference means in accordance with the present invention.

A second embodiment of a signal interference means, in accordance with the present invention, is disclosed in FIGS. 5 and 6. Signal interference means 20a is comprised of mounting means 21a having an inner member 22a secured to support member by split bushings 24a. Sleeve 23a is rotatably mounted on inner member 22a. Discs 25a, 26a made of acoustical absorptive material such as rubber or the like are affixed to sleeve 23a and extend outward into contact with the borehole. Discs 25a, 26a have a plurality of relatively large diameter openings 33, 34, respectively, therethrough. These openings are misaligned when the discs are affixed to sleeve 23a so that a direct path for a signal in the mud is effectively obstructed. However, openings 33, 34 provide a ready path for displacement of fluid whenever apparatus 10 is moved within the borehole.

What is claimed is:

1. An apparatus for carrying out an acoustical logging operation within the borehole of a well, said apparatus comprising:
   a transmitter;
   at least one receiver;

a support member for spacing said at least one receiver for said transmitter;

means mounted on said support member between said transmitter and said at least one receiver for interfering with those signals which inherently travel from said transmitter to said at least one receiver in the fluid normally present in the borehole during said logging operation, said signal interference means comprising:

means for rotatably mounting said signal interference means to said support member; and attenuation elements attached to said mounting means and adapted to extend outward to the wall of said borehole when said apparatus is within the borehole, said attenuation elements positioned on said mounting means so as to present an obstructed path to said signals but so as to present only nominal resistance to displacement of borehole fluid when said apparatus moves within said borehole, said attenuation elements comprising a plurality of fingers attached to said sleeve, said fingers being vertically spaced on said sleeve so that they radially overlap, thereby providing an obstructed path for said signal in said fluid.

2. The acoustical logging apparatus of claim 1 wherein said mounting means comprises:

an inner member affixed to said means for spacing said at least one receiver from said transmitter; and a sleeve rotatably mounted on said inner member, said attenuation elements being attached to said sleeve.

3. The acoustical logging apparatus of claim 1 wherein said fingers are comprised of an acoustical absorptive material.

4. An apparatus for carrying out an acoustical logging operation within the borehole of a well, said apparatus comprising:

a transmitter;

at least one receiver;

a support member for spacing said at least one receiver from said transmitter;

means mounted on said support member between said transmitter and said at least one receiver for interfering with those signals which inherently travel from said transmitter to said at least one receiver in the fluid normally present in the borehole during said logging operation, said signal interference means comprising:

means for rotatably mounting said signal interference means to said support member; and attenuation elements attached to said mounting means and adapted to extend outward to the wall of said borehole when said apparatus is within the borehole, said attenuation elements positioned on said mounting means so as to present an obstructed path to said signals but so as to present only nominal resistance to displacement of borehole fluid when said apparatus moves within said borehole, said attenuation elements comprising a plurality of discs, each having a plurality of relatively large openings therethrough, said discs being attached to said sleeve in a vertically spaced relationship to each other and positioned so that said openings in said discs are misaligned.

5. The acoustical logging apparatus of claim 4 wherein said discs are comprised of an acoustical absorptive material.

* * * * *